United States Patent [19]

Mazakas

[11] Patent Number: 5,244,499
[45] Date of Patent: Sep. 14, 1993

[54] POWDERED PAINT RECOVERY TENT FOR VERTICAL EXTRUSIONS

[76] Inventor: Russell Mazakas, 1691 Solano, Ontario, Calif. 91764

[21] Appl. No.: 901,562

[22] Filed: Jun. 19, 1992

[51] Int. Cl.⁵ .......................... B05C 15/00; B05B 15/12
[52] U.S. Cl. .................................. 118/309; 118/326; 118/312
[58] Field of Search ................. 118/312, 326, DIG. 7, 118/309, 634; 454/50

[56] References Cited

U.S. PATENT DOCUMENTS

| | | | |
|---|---|---|---|
| 4,245,551 | 1/1981 | Berkmann | 118/326 |
| 4,375,487 | 3/1983 | Huber | 118/312 |
| 5,078,084 | 1/1992 | Shutic et al. | 118/326 |
| 5,115,760 | 5/1992 | Maeda | 118/621 |

Primary Examiner—W. Gary Jones
Assistant Examiner—Charles K. Friedman
Attorney, Agent, or Firm—Blakely, Sokoloff, Taylor & Zafman

[57] ABSTRACT

An apparatus that can recover excess paint powder that is blown onto workpieces by a spray gun. The apparatus has a first duct that is placed near the workpiece across from the spray gun. The first duct is preferably constructed as a collapsible tent that can be hung by a ceiling fixture. The tent extends along the length of any workpiece, to insure that all of the powder is collected. The tent can be attached by merely pulling a cable and hooking the top of the tent to the ceiling fixture. Connected to the duct is a fan that draws air from the area around the workpieces into the duct. The fan and duct are constructed so that all of the excess paint powder is removed from the paint area. The duct has an inner cavity that directs the paint powder to a filter that captures the powder so that the paint can be reused.

17 Claims, 2 Drawing Sheets

POWDERED PAINT RECOVERY TENT FOR VERTICAL EXTRUSIONS

BACKGROUND OF THE INVENTION

1. Field of the Invention

The present invention relates to industrial paint systems that spray workpieces with powdered paint.

2. Description of Related Art

Present manufacturing methods typically include a process for painting finished goods. For example, extruded metal parts are usually placed on racks and then passed before spray paint guns that paint the parts. The environmental concerns over the solvents in wet paint, has prompted many in the industry to use dry paint powder. Dry paint processes typically utilize paint guns that spray a dry electrostatically charged paint powder onto the parts. The workpieces are electrically grounded to attract and retain the powder. The powder covered workpieces are then passed through an oven that heats and flows the powder, so that the paint covers and is attached to the part. The extruded parts are typically quite long and are spaced apart 4-6 inches, such that a large amount of powder passes between the workpieces. In a typical assembly line thousands of parts are sprayed during each shift, resulting in the accumulation of a large amount of excess paint that settles throughout the paint area. The excess unused paint accounts for a significant cost in the painting process. It would therefore be desirable to have an apparatus that can collect and contain the excess powder so that the paint can be reused.

The paint powder is toxic, such that the existence of excess powder in the plant or workplace area creates a harmful working condition. The excess paint also tends to adhere to objects other than the workpieces. It would therefore be desirable to have an apparatus that would prevent the paint powder from circulating around the paint area and settling on structures other than the parts. When the paint color is to be changed, the excess powder must be removed from the paint area to insure that the old color powder does not mix with the new color powder. It would also be desirable to have an apparatus that would provide an easy method of changing paint colors.

SUMMARY OF THE INVENTION

The present invention is an apparatus that can recover excess paint powder that is blown onto workpieces by a spray gun. The apparatus has a flexible duct that is placed near the workpieces across from the spray gun. The flexible duct is preferably constructed as a collapsible tent that can be supported from above. The tent extends along the length of any workpiece, to insure that all of the powder is collected. The tent can be raised by merely pulling a cable attached to the top of the tent.

Connected to the duct is a fan that draws air from the area around the workpieces into the duct. The fan and duct are constructed so that all of the excess paint powder is removed from the paint area. The duct has an inner cavity that directs the paint powder to a filter that captures the powder so that the paint can be reused.

Therefore it is an object of this invention to provide a collapsible duct for a dry paint system.

It is also an object of this invention to provide an apparatus that collects the excess paint powder of a powder paint system, such that the excess paint powder does not circulate into undesirable parts of the paint area.

It is also an object of this invention to provide an apparatus that allows the sprayed powder to pass through the parts and be recycled in a separate duct, so that powder does not fall toward the floor of the first duct and cause a heavier coating of the lower portion of the extrusions.

It is also an object of this invention to provide an apparatus that allows the color of a powder paint system to be easily changed.

BRIEF DESCRIPTION OF THE DRAWINGS

The objects and advantages Of the present invention will become more readily apparent to those skilled in the art after reviewing the following detailed description and accompanying drawings, wherein.

DETAILED DESCRIPTION OF THE INVENTION

Figure 1:
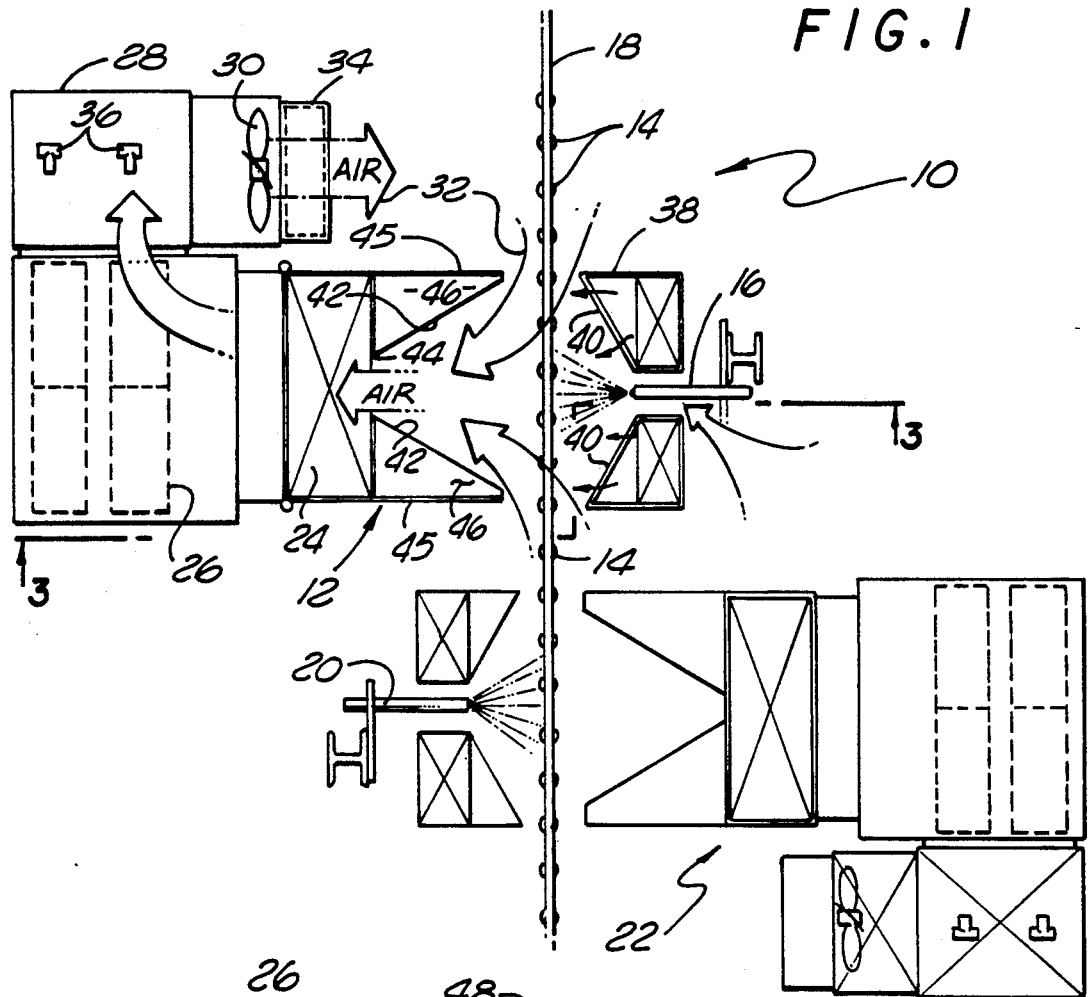
FIG. 1 is a top view showing a floor plan for a paint powder recovery system of the present invention.

Referring to the drawings more particularly by reference numbers, FIG. 1 shows a paint powder recovery system 10 of the present invention. The system 10 has a first duct 12 that draws in excess paint powder which is circulating around the workpieces 14. The workpieces 14 are sprayed with dry electrostatically charged paint powder by a first spray gun 16, as the parts 14 are passed before the gun 16 by a conveyor system 18. Most paint assemblies have a second spray gun 20 that sprays the other half of the workpieces 14, wherein there would be a second recovery system 22 incorporated with the second gun 20. The second recovery system 22 is identical with the first system, except that the second system 22 is oriented 180 degrees relative to the first system 10.

After exiting the first duct 12, the powder may be removed from the airstream in a number of ways. In the preferred embodiment, the first duct 12 has an inner cavity that is in fluid communication with a plurality of primary filters 26. The filters 26 are constructed to capture the excess paint powder. Adjacent to the filters 26 is an exhaust chamber 28 which allows fluid communication between the filters 26 and a fan 30. The exhaust chamber 28 faces the back side of the fan 30, so that the fan 30 induces an airflow 32 from the workpieces 14 to the first duct 12, in the direction indicated by the arrows in FIG. 1. The system 10 may have secondary filters 34 at the output of the fan 30, that capture any excess paint powder that is not removed from the airflow 32 by the primary filters 26. The exhaust chamber 28 has a plurality of blow-down valves 36 that periodically emit a high pressure shock wave that is directed at the primary filters 26. The shock waves jar the primary filters 26, so that the powder falls below the filters 26. It is to be understood that the above described system of separating the powder from the airstream is only one of many approaches. The powder could be removed from the airstream with filters mounted in a stationary housing or removed with a centrifugal cyclone, etc.

In the preferred embodiment, the system 10 may have a second duct 38 located adjacent to the spray gun 16. The second duct 38 helps contain the excess powder and insures that none of the paint circulates behind the gun 16. The second duct 38 can actually be two ducts as shown, or one duct with a hole to allow the gun to extend through. There should be a sufficient space between the gun 16 and duct 38, so that air may flow past the gun 16 to provide an adequate airflow around the parts 14. The second duct 38 is preferably pressurized and has a pair of porous tapered surfaces 40, which eject air to bias the paint powder away from the duct 38. The second duct 38 may be pressurized by connecting the duct 38 to the front side of the fan 30, so that a portion of the airflow produced by the fan 30 is directed into the second duct 38.

In the preferred embodiment, the first duct 12 may have a pair of tapered surfaces 42 that funnel the airflow 32 into a slot 44 which extends along the length of the duct 12. The slot 44 allows the excess powder to flow into the inner cavity 24 of the first duct 12. As an alternative to the slot 44, the first duct 12 may have a plurality of holes along the length of the duct 12. The tapered surfaces 42 may be pressurized and porous, so that a low volume of air is directed toward the workpieces 14. The first duct 12 may have walls 44 attached to the tapered surfaces 42, that define pressure ducts 46 which supply pressurized air to the surfaces 42. The pressure ducts 46 may be connected to the front side of the fan 30, so that the fan 30 directs air toward the tapered surfaces 42.

Figure 2:
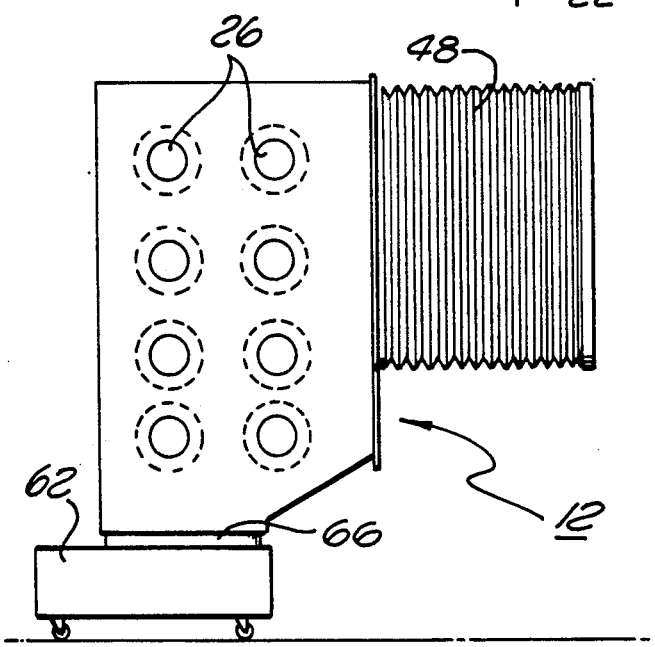
FIG. 2 is a side view of a powder recovery duct in a collapsed position.
Figure 3:
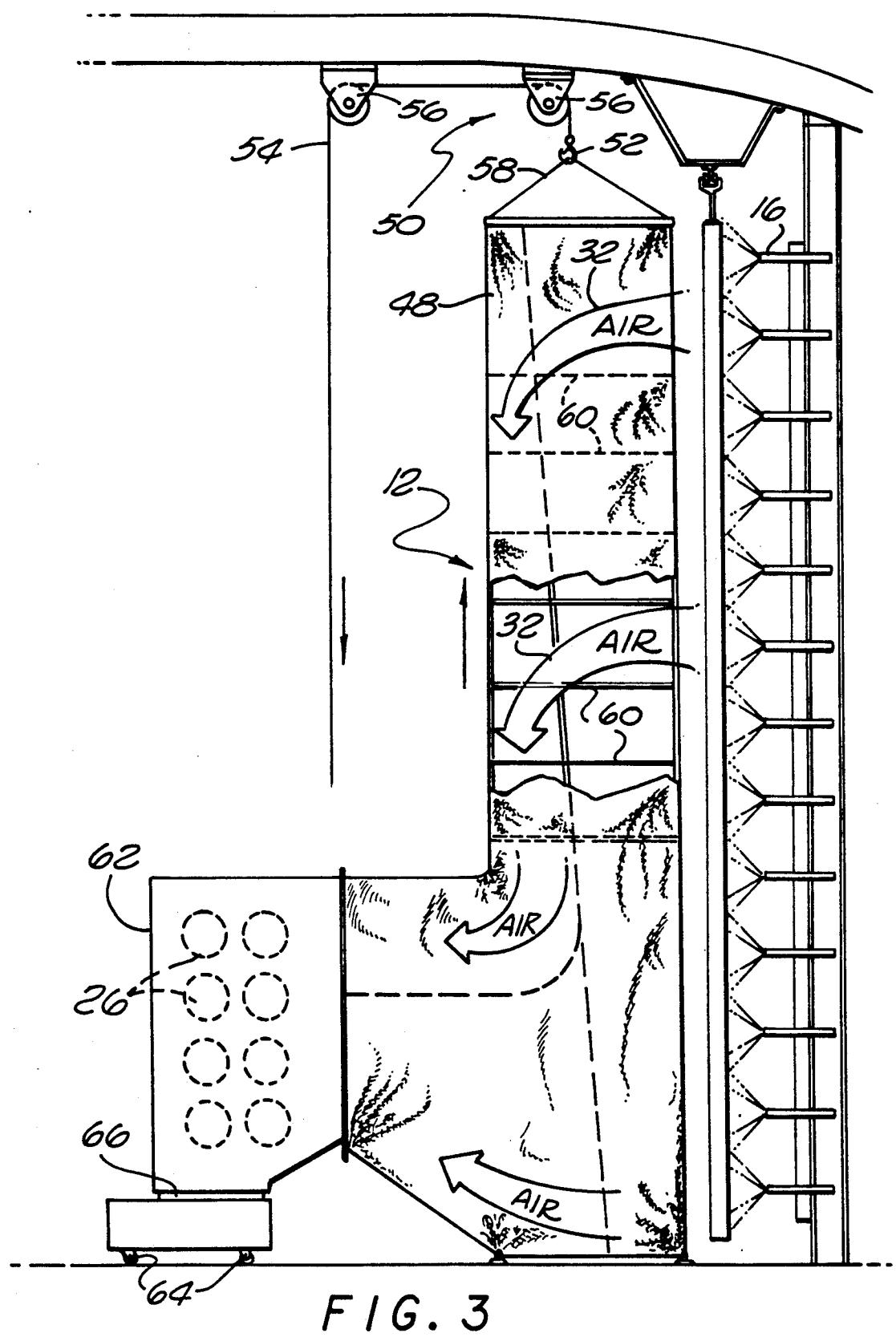
FIG. 3 is a side view of the duct of FIG. 2 shown in an extended installed position.

FIGS. 2 and 3 show a preferred embodiment of the first duct 12. The first duct 12 has a flexible outer shell 48 that is preferably constructed from nylon. The flexible shell 48 allows the duct 12 to be stored in the collapsed condition shown in FIG. 2. To install the duct 12, the shell 48 is attached and supported by a ceiling fixture 50. The ceiling fixture 50 is preferably a hook 52 and cable 54 that are supported by a pair of pulleys 56. To expand the duct 12, the hook 52 is moved to a reachable position, wherein a rope 58 or other attachment member of the duct 12 is attached to the hook 52. The hook 52 is then pulled upward, hoisting the shell 48 into the extended position shown in FIG. 3. The first duct 12 preferably has a plurality of ribs 60 attached and spaced along the length of the shell 48. The ribs 60 provide structural support and prevent the shell 48 from collapsing. The spacing of the ribs 60 should be such that the shell 48 can be collapsed into the compact position shown in FIG. 2. The airflow 32 further defines and maintains the shape of the duct 12.

The first duct 12 could be attached to a portable cabinet 62 which also houses the primary filters 26. The cabinet 62 has wheels 64 that allow the duct 12 and filters 26 to be easily rolled in and out of the paint area. The cabinet 62 also has a removable pan 66 that collects the excess powder that is knocked off of the filters 26 by the blow-down valves 36. There is a different cabinet 62 for each color of paint, so that the paint color can be changed by merely replacing cabinets 62.

To operate the recovery system 10, a cabinet 62 is rolled up to the conveyor system 18 and the first duct 12 is hoisted into place. The cabinet 62 is connected to the stationary exhaust chamber 28, wherein the fan 30 is turned on and the workpieces 14 are then sprayed with paint powder by the spray gun 16. The airflow 32 draws the excess paint into the inner cavity of the duct 12 and onto the primary filters 26. The airflow 32 should be great enough to draw in all of the excess powder, but low enough so that the powder is not sucked into the duct 12 before any of the paint can adhere to the workpieces 14. The blow-down valves 36 knock the excess powder off of the filters 26 and into the pan 66, where the powder can be removed and reused. As an alternative, the pan 66 can be coupled to the spray gun 16 to feed the excess powder directly into the gun 16. To change the color of the paint, the duct 12 is hoisted down and collapsed so that the cabinet 62 can be rolled away. The spray gun 16 can be blown clean before the duct is removed to capture any residual powder within the gun 16 and gun hoses. After the first cabinet is removed, a second cabinet corresponding to a different color can be rolled in. The exhaust chamber 28 is connected and the first duct of the second cabinet is hoisted into place. Because the second duct 38 biases the powder away from the tapered surfaces 40, the second duct 38 may have to be replaced when the paint colors are changed. The second recovery system 22 operates in the same manner as the first recovery system 10.

While certain exemplary embodiments have been described in detail and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus that can recover excess paint powder that is sprayed at a workpiece by a spray gun, comprising:

a collapsible first duct with an inner cavity in fluid communication with the workpiece such that the excess paint powder can flow from the workpiece to said inner cavity, said collapsible first duct being adapted to be moved between a collapsed position and an expanded position; and, first flow means for inducing an airflow from the workpiece to said first duct such that the excess paint powder flows into said inner cavity of said first duct.

2. The apparatus as recited in claim 1, further comprising a second duct adjacent to the spray gun and opposite from said first duct, said second duct having a pair of porous tapered second surfaces and second flow means that bias the excess paint powder away from said second duct.

3. The apparatus as recited in claim 1, wherein said first duct is constructed from a plastic shell that has a plurality of spaced apart ribs that support said plastic shell.

4. The apparatus as recited in claim 3, wherein said plastic shell is adapted to be attached to a ceiling fixture.

5. The apparatus as recited in claim 1, wherein said first duct has a pair of tapered first surfaces that direct the excess paint powder to a slot that allows fluid communication between said inner cavity and the workpiece.

6. The apparatus as recited in claim 5, wherein said tapered first surfaces are porous and have second flow means that bias the excess paint powder away from said tapered first surfaces.

7. The apparatus as recited in claim 1, further comprising at least one primary filter in fluid communication with said inner cavity, said primary filter being constructed to capture the excess paint powder within said airflow.

8. The apparatus as recited in claim 7, further comprising a portable cabinet adapted to house said first duct and said primary filter.

9. An apparatus that can recover excess paint powder that is sprayed at a workpiece by a spray gun, comprising:

- a collapsible first duct with an inner cavity in fluid communication with the workpiece such that the excess paint powder can flow from the workpiece to said inner cavity;
- first flow means for inducing an airflow from the workpiece to said first duct such that the excess paint powder flows into said inner cavity of said first duct;
- at least one primary filter in fluid communication with said inner cavity, said primary filter being constructed to capture the excess paint powder within said airflow; and,
- a portable cabinet adapted to house said first duct and said primary filter.

10. The apparatus as recited in claim 9, further comprising a second duct adjacent to the spray gun and opposite from said first duct, said second duct having a pair of porous tapered second surfaces and second flow means that bias the excess paint powder away from said second duct.

11. The apparatus as recited in claim 9, wherein said first duct is constructed from a plastic shell that has a plurality of spaced apart ribs that support said plastic shell.

12. The apparatus as recited in claim 11, wherein said plastic shell is adapted to be attached to a ceiling fixture.

13. The apparatus as recited in claim 12, wherein said first duct has a pair of tapered first surfaces that direct the excess paint powder to a slot that allows fluid communication between said inner cavity and the workpiece.

14. The apparatus as recited in claim 13, wherein said tapered first surfaces are porous and have second flow means that bias the excess paint powder away from said tapered first surfaces.

15. A apparatus that can recover excess paint powder that is sprayed at a workpiece by a spray gun, comprising:

- a collapsible first duct that is adapted to be expanded and attached to a ceiling fixture, said first duct having an inner cavity in fluid communication with the workpiece such that the excess paint powder can flow from the workpiece to said inner cavity;
- first flow means for inducing an airflow from the workpiece to said first duct such that the excess paint powder flows into said inner cavity of said first duct;
- at least one primary filter in fluid communication with said inner cavity, said primary filter being constructed to capture the excess paint powder within said airflow;
- a portable cabinet adapted to house said first duct and said primary filter; and,
- a second duct adjacent to the spray gun and opposite from said first duct, said second duct having a pair of porous tapered second surfaces and second flow means that bias the excess paint powder away from said second duct and toward said first duct.

16. The apparatus as recited in claim 15, wherein said first duct has a pair of tapered first surfaces that direct the excess paint powder to a slot that allows fluid communication between said inner cavity and the workpiece.

17. The apparatus as recited in claim 16, wherein said tapered first surfaces are porous and have third flow means that bias the excess paint powder away from said tapered first surfaces.

* * * * *

UNITED STATES PATENT AND TRADEMARK OFFICE
CERTIFICATE OF CORRECTION

PATENT NO. : 5,244,499
DATED : September 14, 1993
INVENTOR(S) : Mazakas

It is certified that error appears in the above-indentified patent and that said Letters Patent is hereby corrected as shown below:

In column 2 at line 14 change "Of" to --of--.

In column 2 at line 45 after "inner cavity" insert --24--.

In column 6 at line 3 change "A apparatus" to --An apparatus--.

Signed and Sealed this

Sixth Day of June, 1995

Attest:

BRUCE LEHMAN

Attesting Officer

Commissioner of Patents and Trademarks